(12) United States Patent
Watanabe et al.

(10) Patent No.: US 10,944,883 B2
(45) Date of Patent: Mar. 9, 2021

(54) IMAGE FORMING APPARATUS WITH EFFECTIVE MEASURE FOR RESTORING IMAGE QUALITY

(71) Applicant: FUJI XEROX CO., LTD., Tokyo (JP)

(72) Inventors: Satoshi Watanabe, Kanagawa (JP);
Yuta Yamaguchi, Kanagawa (JP);
Tomoaki Hirano, Kanagawa (JP);
Yusaku Kurihara, Kanagawa (JP);
Masao Yamada, Kanagawa (JP);
Takahiko Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 153 days.

(21) Appl. No.: 16/004,435

(22) Filed: Jun. 11, 2018

(65) Prior Publication Data
US 2018/0367696 A1    Dec. 20, 2018

(30) Foreign Application Priority Data

Jun. 19, 2017   (JP) ............................. JP2017-119468

(51) Int. Cl.
*H04N 1/32* (2006.01)
(52) U.S. Cl.
CPC ... *H04N 1/32448* (2013.01); *H04N 2201/325* (2013.01); *H04N 2201/3298* (2013.01)
(58) Field of Classification Search
CPC ....... H04N 1/32448; H04N 2201/3298; H04N 2201/325
See application file for complete search history.

(56) References Cited

U.S. PATENT DOCUMENTS

| 2003/0090695 | A1* | 5/2003 | Murata | H04N 1/32128 358/1.13 |
| 2005/0191105 | A1* | 9/2005 | Narusawa | H04N 1/00278 400/76 |
| 2007/0081182 | A1* | 4/2007 | Shiohara | H04N 1/64 358/1.13 |
| 2009/0167781 | A1* | 7/2009 | Nakata | H04N 1/32358 345/596 |
| 2009/0190147 | A1* | 7/2009 | Uruta | H04N 1/233 358/1.9 |
| 2009/0190848 | A1* | 7/2009 | Watanabe | G06K 15/02 382/240 |

FOREIGN PATENT DOCUMENTS

| JP | H06-143756 | 5/1994 |
| JP | H09-295432 | 11/1997 |
| JP | 2005-153473 | 6/2005 |

\* cited by examiner

*Primary Examiner* — Juan M Guillermety
(74) *Attorney, Agent, or Firm* — JCIPRNET

(57) ABSTRACT

An image forming apparatus includes an executing unit configured to, if there is a shortage of storage capacity for image information necessary to perform image formation, execute the image formation at a reduced image quality below a required image quality, and an informing unit configured to inform that image formation has been executed at a reduced image quality, and inform an effective measure to enable image formation that does not involve a reduction in image quality, the effective measure including at least one of making a setting change to storage capacity allocation and increasing storage capacity.

8 Claims, 11 Drawing Sheets

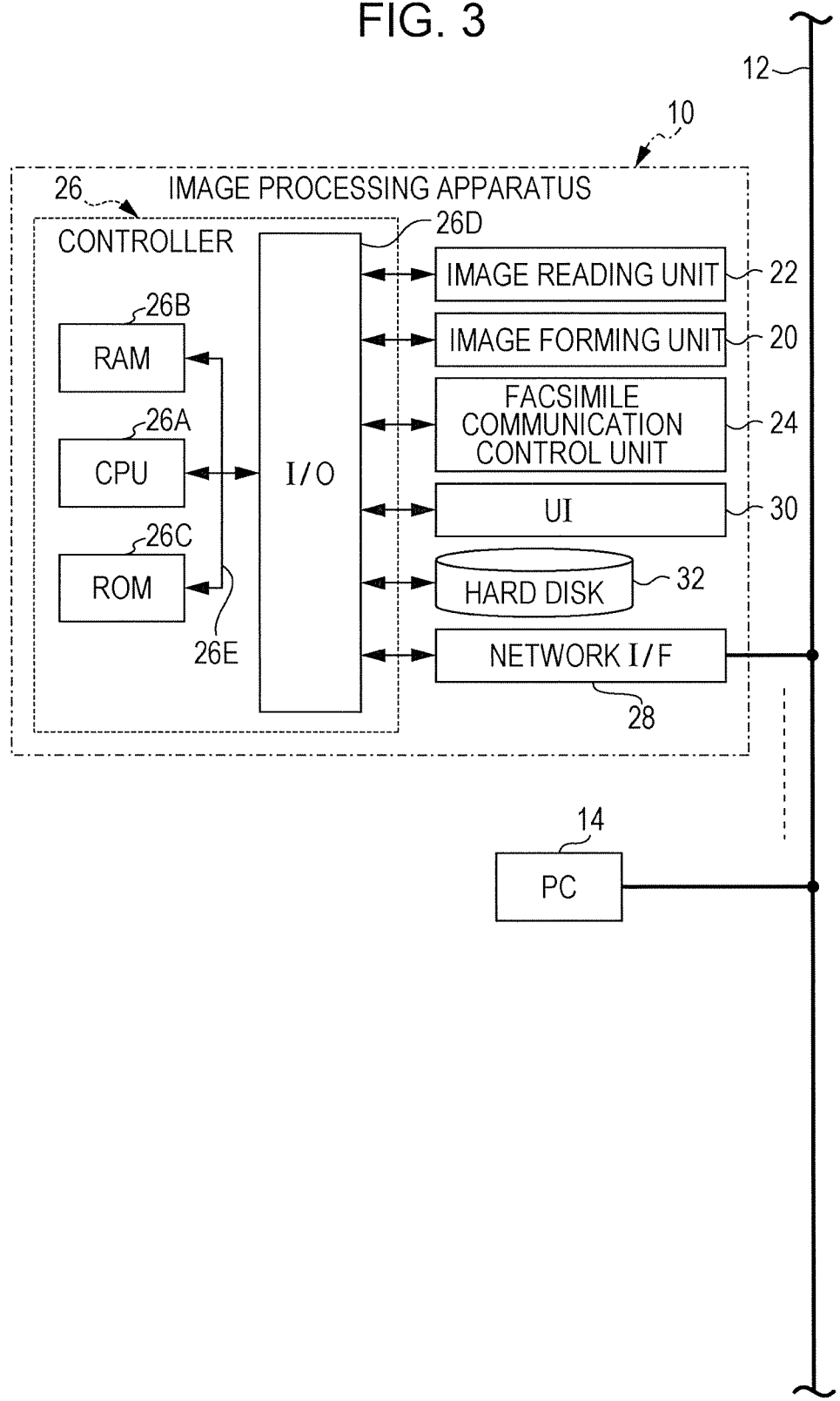

MEMORY: FIRST STORAGE DEVICE OR
          SECOND STORAGE DEVICE

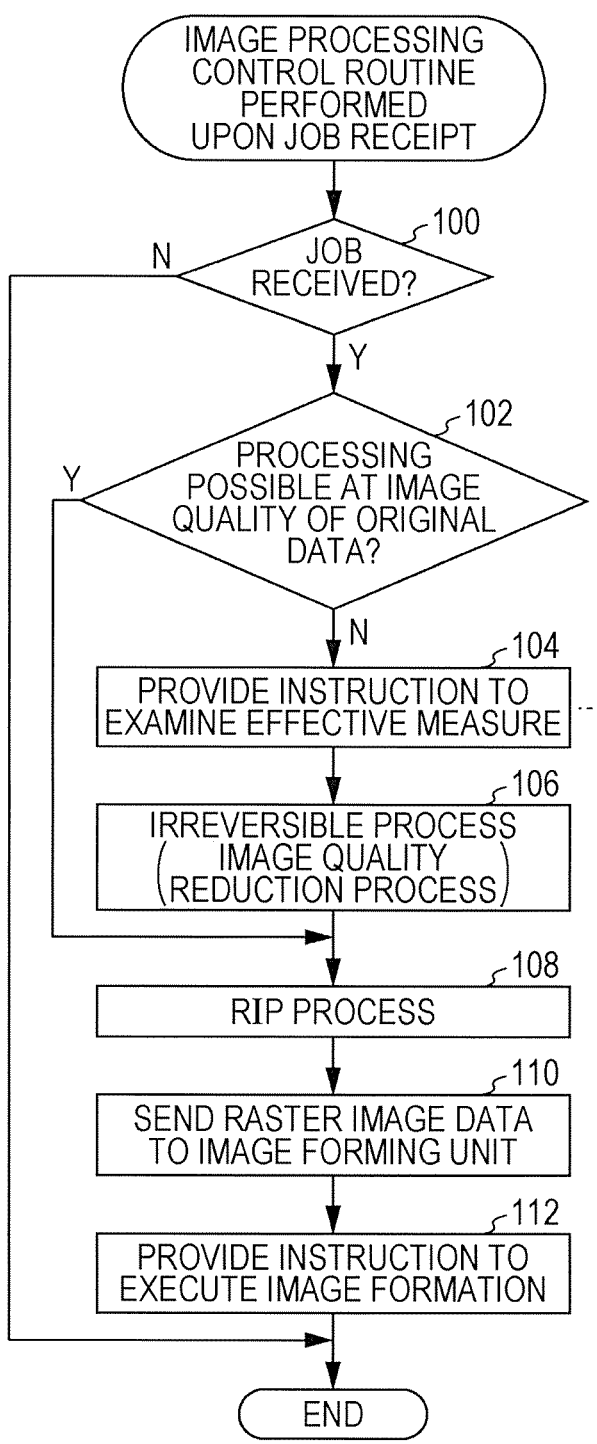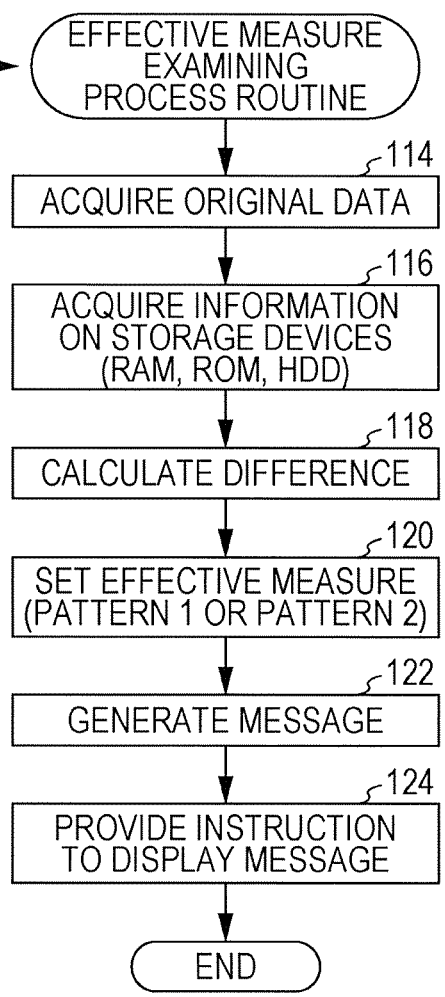

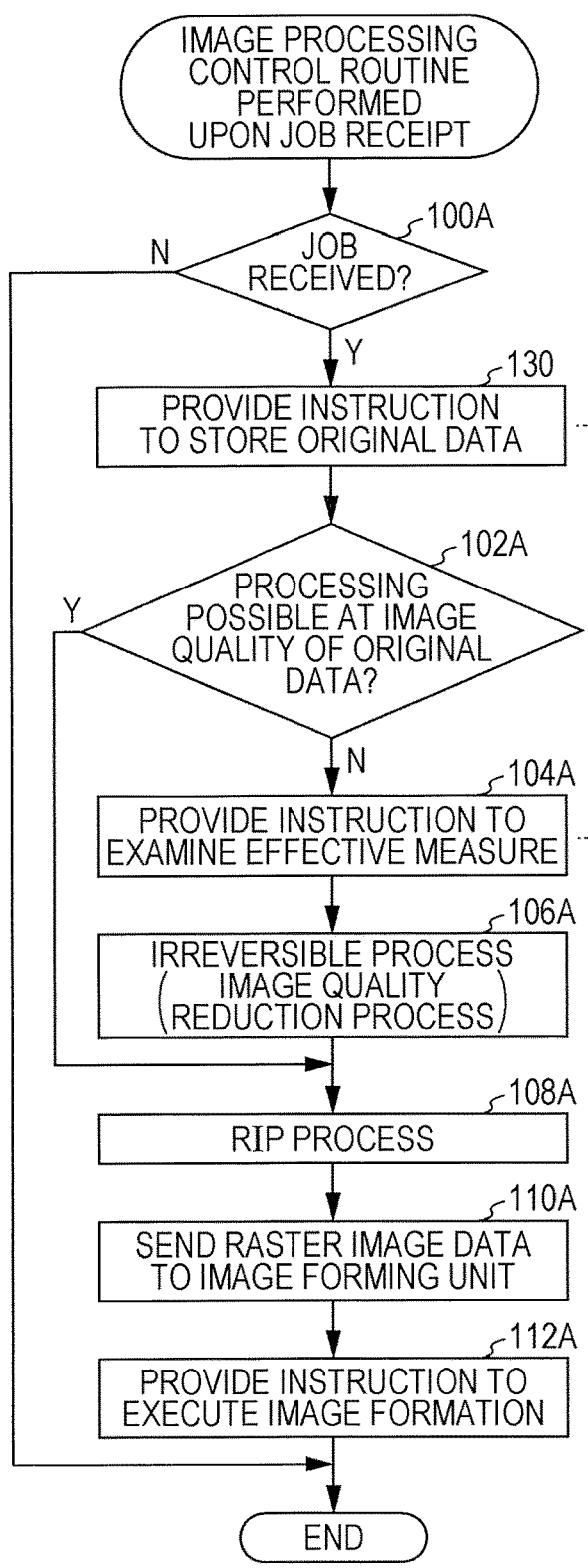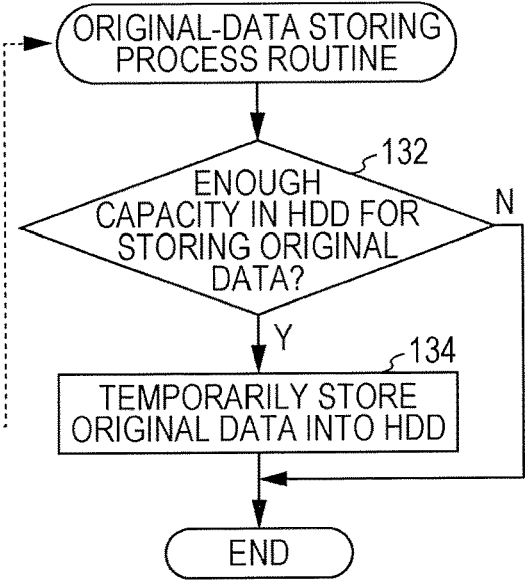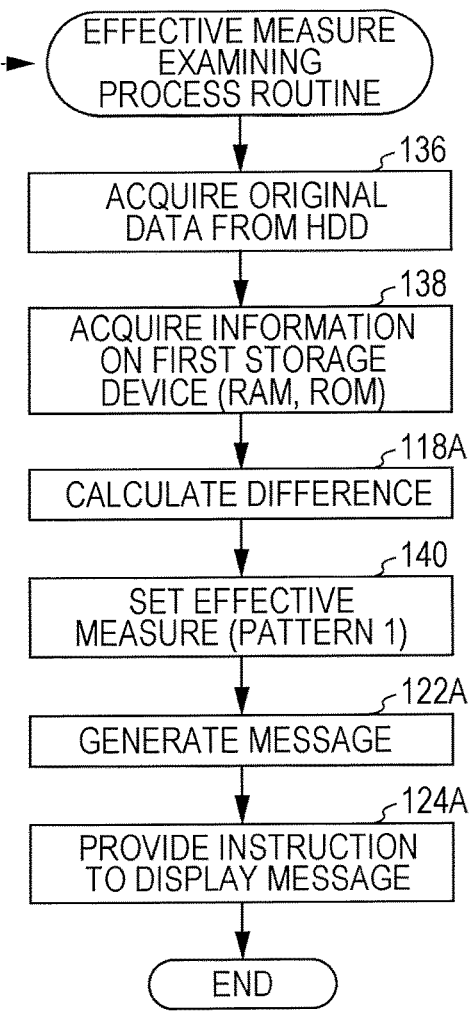

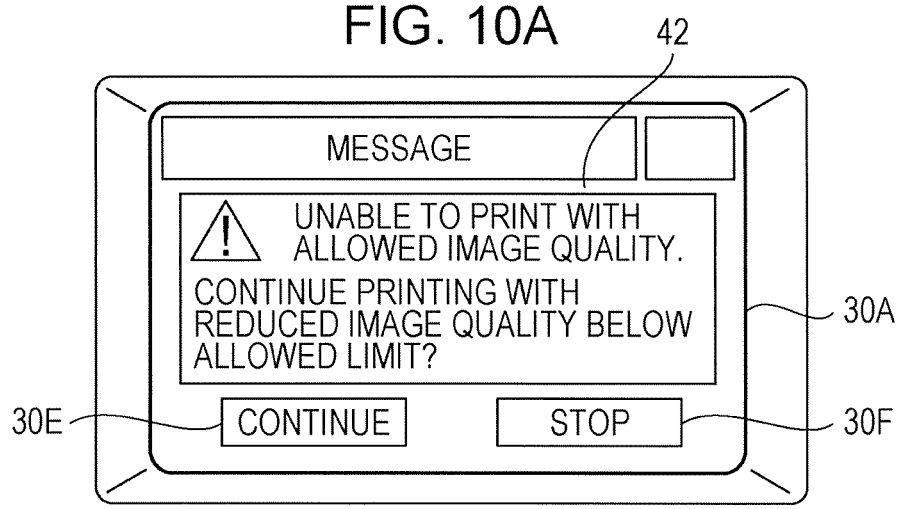
FIG. 10A
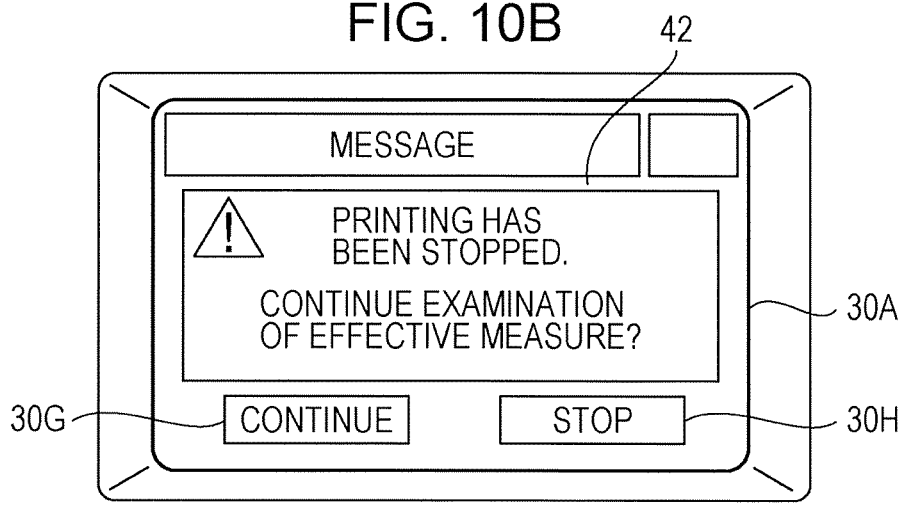
FIG. 10B
FIG. 10C
FIG. 10D
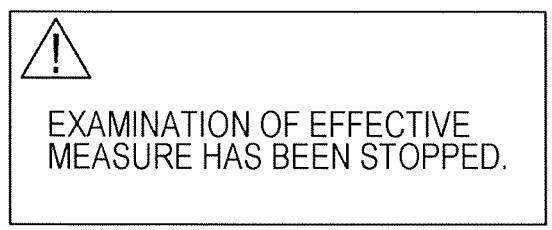

IMAGE FORMING APPARATUS WITH EFFECTIVE MEASURE FOR RESTORING IMAGE QUALITY

CROSS REFERENCE TO RELATED APPLICATIONS

This application is based on and claims priority under 35 USC 119 from Japanese Patent Application No. 2017-119468 filed Jun. 19, 2017.

BACKGROUND

Technical Field

The present invention relates to an image forming apparatus.

SUMMARY

According to an exemplary embodiment of the present invention, there is provided an image forming apparatus including an executing unit configured to, if there is a shortage of storage capacity for image information necessary to perform image formation, execute the image formation at a reduced image quality below a required image quality, and an informing unit configured to inform that image formation has been executed at a reduced image quality, and inform an effective measure to enable image formation that does not involve a reduction in image quality, the effective measure including at least one of making a setting change to storage capacity allocation and increasing storage capacity.

BRIEF DESCRIPTION OF THE DRAWINGS

Exemplary embodiments of the present invention will be described in detail based on the following figures, wherein:

FIG. 3 is a block diagram illustrating the configuration of the control system of the image processing apparatus according to the first exemplary embodiment;

FIG. 6A is a flowchart illustrating an image processing control routine performed upon job receipt according to the first exemplary embodiment;

FIG. 6B is a control flowchart for an effective measure examining process routine that activates when the corresponding instruction is provided at step 104 in FIG. 6A;

FIG. 7A is a flowchart illustrating an image processing control routine performed upon job receipt according to a second exemplary embodiment:

FIG. 7B is a control flowchart for an original-data storing process routine that activates when the corresponding instruction is provided at step 130 in FIG. 7A;

FIG. 7C is a control flowchart for an effective measure examining process routine that activates when the corresponding instruction is provided at step 104A in FIG. 7A;

FIGS. 10A and 10B are each a front view of the touch panel according to the third exemplary embodiment with a message displayed on the touch panel; and FIGS. 10C and 10D each illustrate exemplary transition of a message displayed on the touch panel.

DETAILED DESCRIPTION

First Exemplary Embodiment

Figure 1:
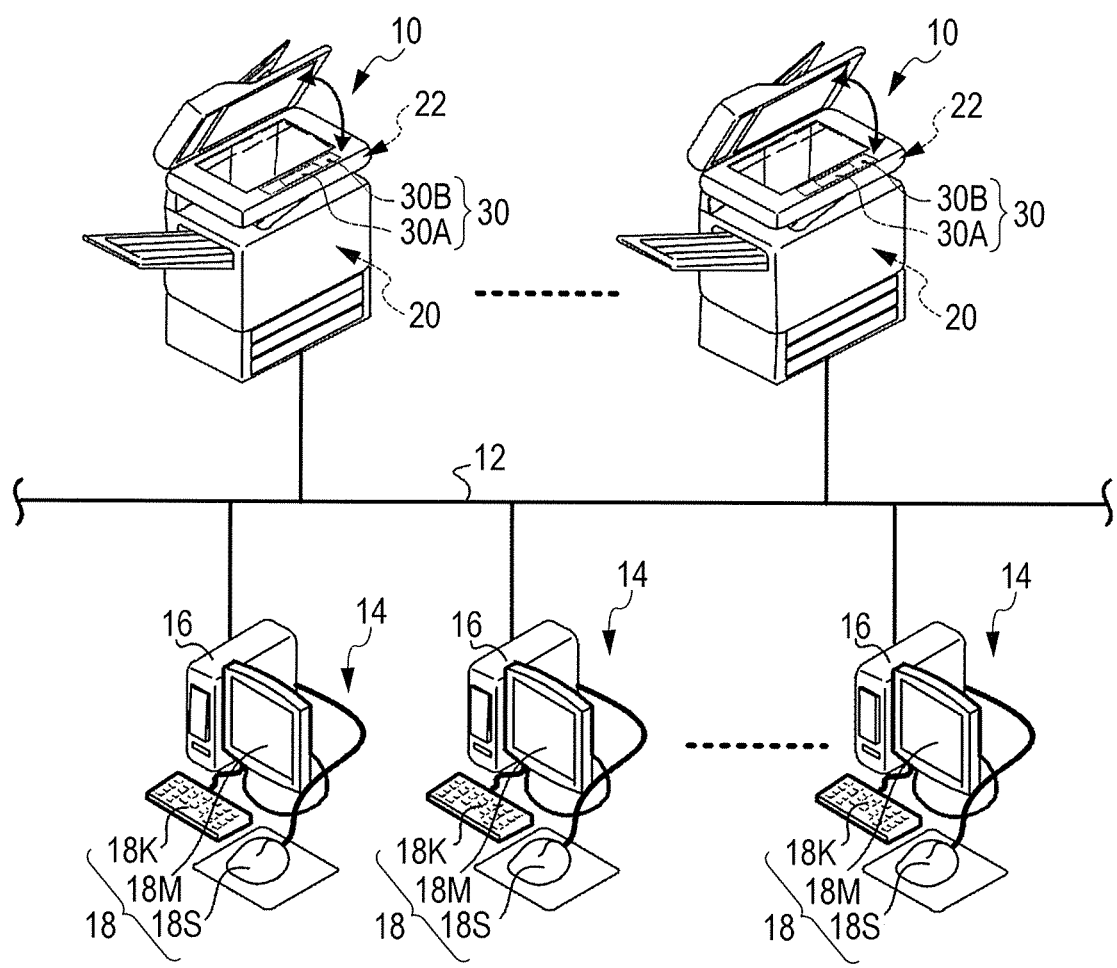
FIG. 1 schematically illustrates a communication network including an image processing apparatus according to a first exemplary embodiment.

FIG. 1 schematically illustrates a communication network on which an information communication system including an image processing apparatus according to a first exemplary embodiment is built.

As illustrated in FIG. 1, an image processing apparatus 10 is connected to a communication network 12 such as the Internet. The communication network 12 may be, for example, a local area network (LAN) or the Internet, or may be made up of multiple LANs connected with each other by a wide area network (WAN). Not all communication systems including the communication network 12 do not need to be wired connections. That is, some or all of the communication systems may be wireless communication networks that transmit and receive information by means of radio.

Although two image processing apparatuses 10 are connected in FIG. 1, the number of image processing apparatuses 10 to be connected is not limited to this but may be one or may be three or more.

The communication network 12 is connected with multiple personal computers (PCs) 14, which each represent an exemplary image information source from which image information is transmitted. The PCs 14 each have a body 16, and a user interface (UI) 18. The UI 18 includes a monitor 18M that serves as a display, and a keyboard 18K and a mouse 18S that each serve as an input operation unit.

Although three PCs 14 are connected in FIG. 1, the number of PCs 14 to be connected is not limited to this but may be one or two, or may be four or more. The image information source is not limited to the PC 14, nor does the image information source need to have a wired connection. That is, the image information source may be a communication terminal apparatus that transmits and receives information by means of radio.

As illustrated in FIG. 1, examples of cases where an instruction is provided to the image processing apparatus 10 include when image information (job data) is transferred from the PC 14 to the image processing apparatus 10 to instruct that an image be formed (printed) (transmission of a print job), and when a user stands in front of the image processing apparatus 10 and provides an instruction to perform a process such as copying, scanning (image reading), or facsimile transmission/reception.

Figure 2:
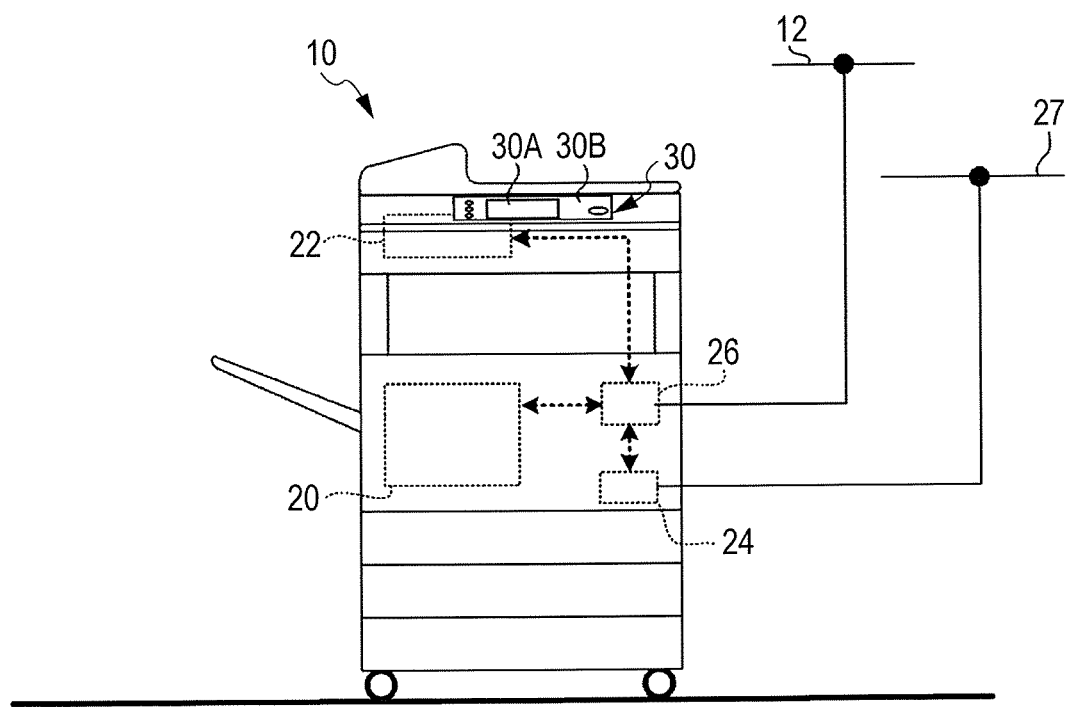
FIG. 2 is a front view of the image processing apparatus according to the first exemplary embodiment.

FIG. 2 illustrates the image processing apparatus 10 according to the first exemplary embodiment 10. The image processing apparatus 10 includes an image forming unit 20, which serves as an image forming apparatus that forms an image on recording paper, an image reading unit 22 that reads a document image, and a facsimile communication control unit 24. A user interface 30 (to be referred to as UI 30 hereinafter) is attached on the front side of the housing of the image processing apparatus 10.

The image reading unit 22 is provided with a platen glass on which a document is positioned, a scan drive unit that scans an image of a document placed on the platen glass by irradiating the image with light, and a photoelectric conversion element such as a charge coupled device that receives light reflected from or transmitted through an image scanned by the scan drive system and converts the received light into an electrical signal.

The image forming unit 20 includes a photoconductor. The following components are disposed around the photoconductor: a charging device that uniformly charges the photoconductor, a scanning exposure unit that scans an image with a beam of light based on image data, an image developing unit that develops an electrostatic latent image formed through the scanning exposure performed by the scanning exposure unit, a transfer unit that transfers the developed image on the photoconductor to recording paper, and a cleaning unit that cleans the surface of the photoconductor after the transfer process. A fixing unit is also disposed on the transport path of recording paper to fix an image transferred to recording paper onto the recording paper.

The image processing apparatus 10 includes a controller 26. The controller 26 controls the image forming unit 20, the image reading unit 22, and the facsimile communication control unit 24 to, for example, temporarily store image data of a document image read by the image reading unit 22, or send the read data either to the image forming unit 20 or the facsimile communication control unit 24, or to the PC 14 (see FIG. 1).

The controller 26 is connected with the communication network 12, and the facsimile communication control unit 24 is connected with a telephone line 27. The controller 26 is connected to, for example, the PC 14 (including a server or a host computer) via the communication network 12. The controller 26 serves such functions as receiving a print job (including image information), or executing facsimile reception and facsimile transmission by use of the telephone line 27 via the facsimile communication control unit 24.

FIG. 3 is a block diagram of the control system for the controller 26 of the image processing apparatus 10 and for the PC 14.

As illustrated in FIG. 3, the controller 26 of the image processing apparatus 10 includes a CPU 26A, a RAM 26B, a ROM 26C, an input/output unit 26D (to be referred to as I/O 26D hereinafter), and a bus 26E that connects these components, such as a data bus or a control bus. The RAM 26B and the ROM 26C each function as a first storage device. In particular, the RAM 26B is required to have a sufficient storage capacity for storing at least one unit (e.g., one page) of raster image data (e.g., bitmap data) during image formation performed by the image forming unit 20.

The I/O 26D is connected with a network I/F 28, which enables communication with the communication network 12, and the UI 30. The UI 30 includes a touch panel 30A, and hard keys 30B dotted around the touch panel 30A.

The I/O 26D is connected with the image reading unit 22, the image forming unit 20, and the facsimile communication control unit 24.

Further, the I/O 26D is connected with a hard disk (HDD) 32 serving as a mass recording medium, which represents an example of a second storage device. The HDD 32 stores information such as a print job (including image information) received from the PC 14 or other components, image information read by the image reading unit 22, and image information received by the facsimile communication control unit 24.

In some cases, for example, the amount of information (original data size) transmitted from the PC 14 exceeds the processing capability of the image forming unit 20 of the image processing apparatus 10. In terms of resolution, an example of such cases is when the image forming unit 20 is capable of 600 dpi but image information with a resolution of 1200 dpi is transmitted form the PC 14.

According to the first exemplary embodiment, for an original data size that exceeds the processing capability of the image forming unit 20, image formation is executed at a reduced image quality (at a reduced resolution), and an effective measure to enable image formation without changing the original data size is examined, basically in parallel with the above image formation.

According to the first exemplary embodiment, an indication that an image has been formed (printed) at a reduced image quality is displayed on the touch panel 30A of the UI 30 to inform the user to that effect, and also an effective measure is displayed on the touch panel 30A and informed to the user.

Examination of an effective measure specifically refers to calculating the difference between the storage capacity necessary for storing one unit of original data at the time of image formation, and the currently available storage capacity of the image processing apparatus 10, and securing the lacking storage capacity calculated as a result.

Conceivable methods for securing storage capacity include the following two patterns.

Pattern 1: Changing Storage Area Setting

With the first storage device such as the RAM 26B or the ROM 26C as well as the second storage device such as the HDD 32, a storage area is allocated in advance for each of the image forming unit 20, the image reading unit 22, and the facsimile communication control unit 24 (to be called devices hereinafter when collectively referred to). In this case, the basic assumption is that a device does not use a storage area allocated for a difference device even when the storage area is free. Accordingly, the setting of storage capacity allocation is changed by taking usage history or other information into account to secure the storage capacity for the image forming unit 20.

Although such a setting change is basically made on the first storage device, if the HDD 32 is used as a cache memory, the storage capacity for the image forming unit 20 may be secured by, based on usage history, deleting already-stored information or cleaning up storage areas.

Pattern 2: Adding More (Increasing) Storage Devices

This involves, if there is not enough storage capacity, adding more storage devices (in particular, adding more first storage devices) to secure the lacking storage capacity.

In displaying information on the touch panel 30A of the UI 30 to inform that an image has been formed (printed) at a reduced image quality, if it is possible to secure the storage capacity for the image forming unit 20 by means of at least one of Pattern 1 and Pattern 2, information to that effect is displayed as an indication of an effective measure.

In this case, it is desired that the effective measure of Pattern 1 be given the higher priority. This is because Pattern 1 allows a shortage of storage capacity to be addressed more quickly than by addition of more storage devices, and does not involve the cost required to add more storage devices. This measure proves particularly effective when the shortage of storage capacity is temporary.

Figure 4A:
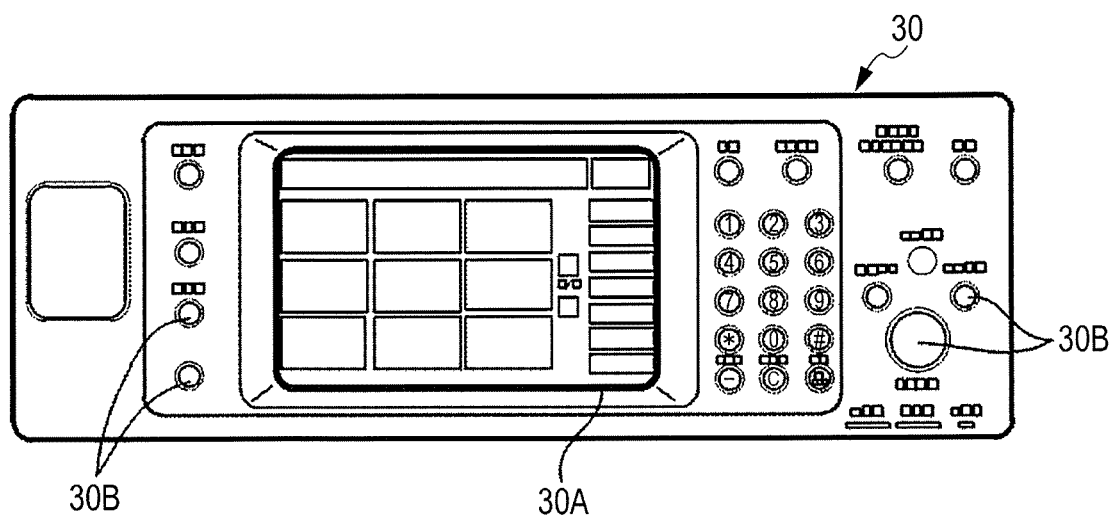
FIG. 4A is a front view of a UI of the image processing apparatus.

FIG. 4A is a detailed front view of the UI 30. The UI 30 includes the touch panel 30A, and the hard keys 30B (only some of which are depicted in FIG. 4A) dotted around the touch panel 30A.

Figure 4B:
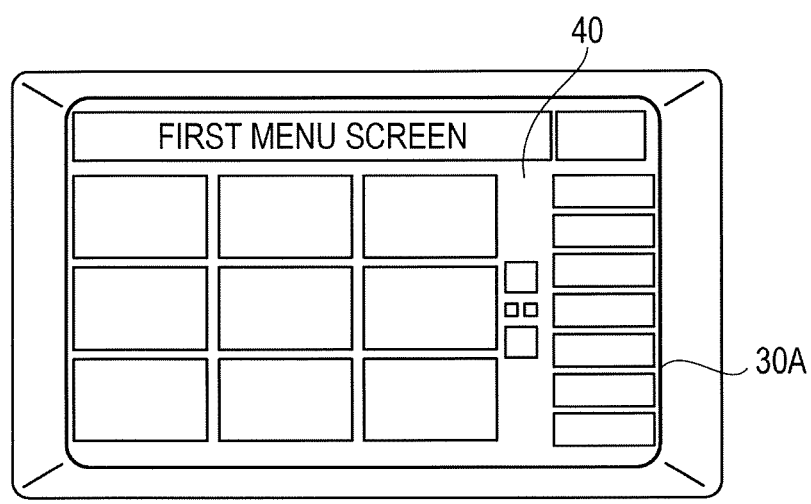
FIG. 4B is a front view of a touch panel with a first menu screen displayed on the touch panel.

The touch panel 30A has a first menu screen 40 (see FIG. 4B) as its basic screen. Performing a touch operation on various functional areas defined and displayed on the first menu screen causes the first menu screen to switch to a second menu screen related to the corresponding function.

Figure 4C:
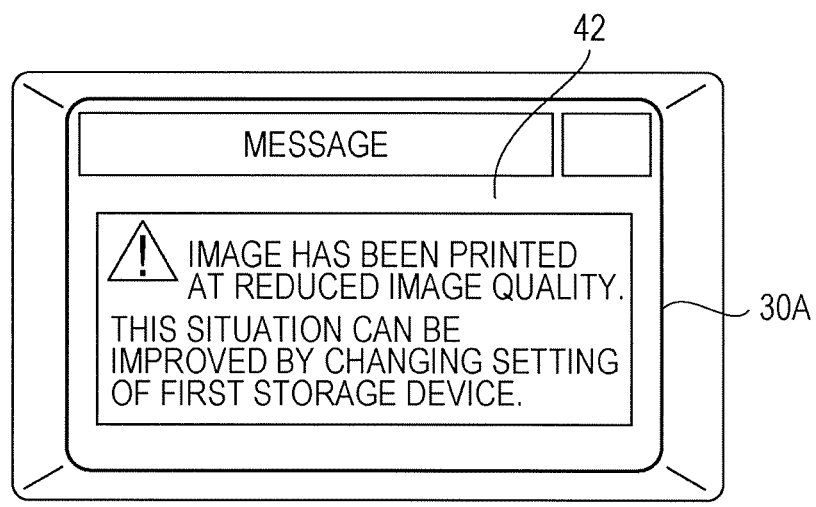
FIG. 4C is a front view of the touch panel with a message displayed on the touch panel.

FIG. 4C illustrates a second menu screen 42 displayed if an image has been formed (printed) at a reduced image quality during image formation performed by the image forming unit 20, with a message appearing on the second menu screen 42.

As an exemplary message corresponding to the effective measure of Pattern 1, as illustrated in FIG. 4C, the following message is displayed on the second menu screen 42: "The image has been printed at a reduced image quality. This situation can be improved by changing the setting of the first storage device".

Figure 4D:
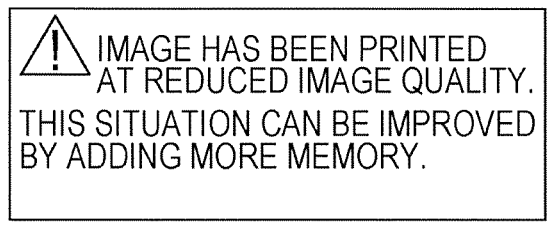
FIGS. 4D and 4E each illustrate another exemplary message displayed on the touch panel.

As an exemplary message corresponding to the effective measure of Pattern 2, as illustrated in FIG. 4D, the following message is displayed on the second menu screen 42: "The image has been printed at a reduced image quality. This situation can be improved by adding more memory". Although the term memory basically refers to the first storage device such as the RAM 26B or the ROM 26C, the term may also refer to the second storage device such as the HDD 32.

Figure 4E:

As an exemplary message to be displayed on the second menu screen 42 when there is no effective measure, as illustrated in FIG. 4E, the following message is displayed on the second menu screen 42: "The image has been printed at a reduced image quality".

Figure 5:
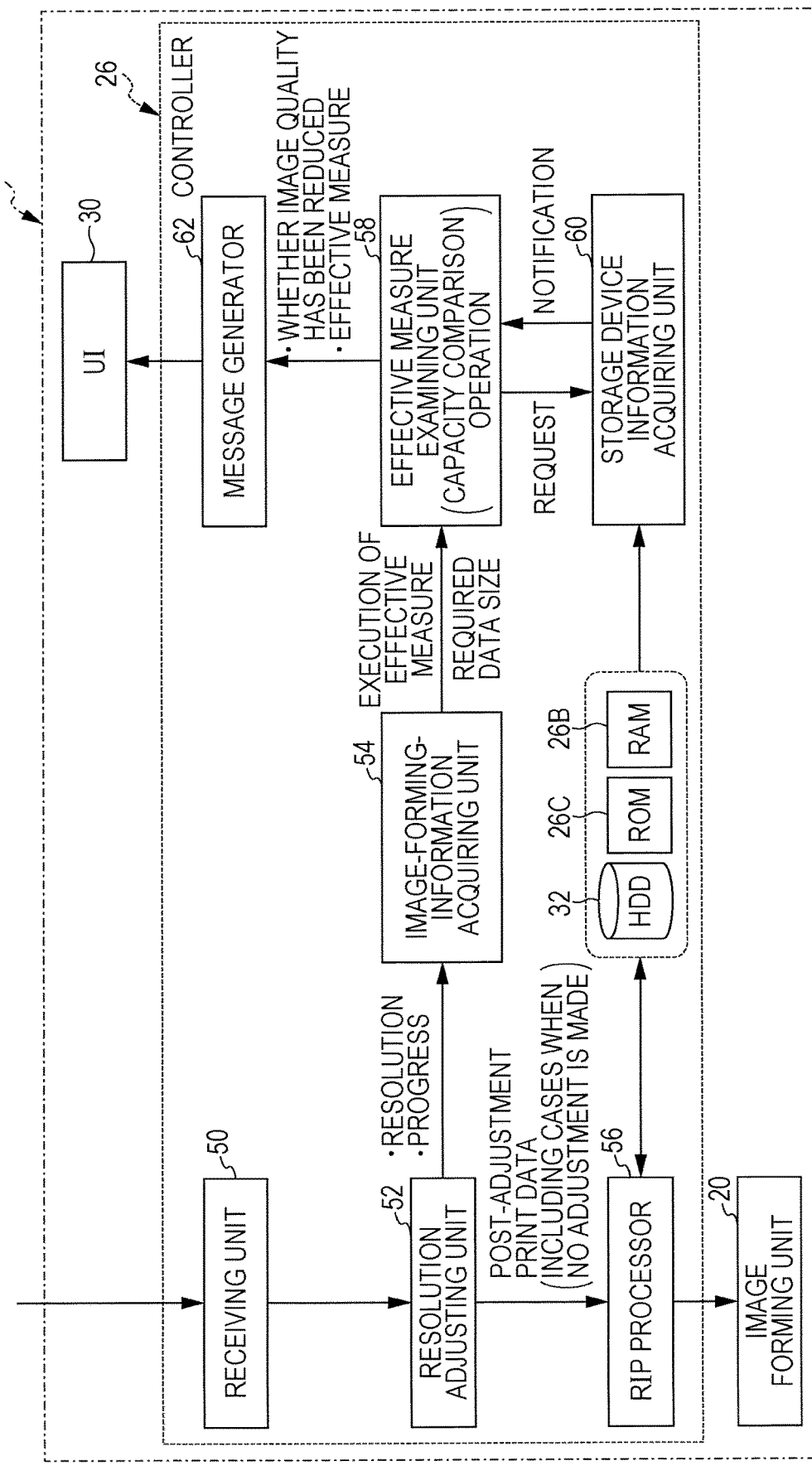
FIG. 5 illustrates functional blocks into which processes executed by a controller according to the first exemplary embodiment are divided by their function, the processes including a resolution control that reduces image quality to enable image formation and a process related to an effective measure to secure storage capacity.

FIG. 5 illustrates functional blocks into which processes executed by the controller 26 according to the first exemplary embodiment are divided by their function, the processes including a resolution control that reduces image quality to enable image formation and a process related to an effective measure to secure storage capacity. The illustrated functional blocks are not intended to limit the hardware configuration of the controller 26. Some or all of the associated functions may be implemented by a software program that is stored in the ROM 26C in advance.

A receiving unit 50 receives, from the PC 14, a job instructing that image formation be executed, for example.

The receiving unit 50 is connected to a resolution adjusting unit 52. The resolution adjusting unit 52 determines, based on the amount of information (original data size) of print data included in the job, whether there is enough storage capacity secured for performing image formation in the image forming unit 20, and executes resolution adjustment based on the determination result. Of course, this includes cases where there is no need to adjust resolution.

If resolution adjustment (resolution reduction) is executed, this inevitably results in reduced image quality. The resolution adjusting unit 52 is connected to an image-forming-information acquiring unit 54. Information (resolution and progress) on the resolution adjusting unit 52 is sent to the image-forming-information acquiring unit 54.

The resolution adjusting unit 52 transmits post-adjustment print data to a RIP processor 56. The RIP processor 56 converts print data into raster image data, and stores, into a RAM 16B serving as the first storage device, raster image data for one page of recording paper.

Whenever one page of raster image data is stored into the RAM 26B (see FIG. 3), the RIP processor 56 sends the one page of raster image data to the image forming unit 20. As a result, in the image forming unit 20, image formation corresponding to the received job proceeds as the process of forming an image on recording paper on a page-by-page basis is repeated.

The image-forming-information acquiring unit 54 receives resolution information and progress information from the resolution adjusting unit 52. Of the two pieces of information received, the image-forming-information acquiring unit 54 analyzes the resolution information, and if an adjustment to reduce resolution has been executed, the image-forming-information acquiring unit 54 instructs an effective measure examining unit 58 to execute examination of an effective measure.

When instructed to execute examination of an effective measure, the effective measure examining unit 58 requests a storage device information acquiring unit 60 for storage device information. In response to this request, the storage device information acquiring unit 60 acquires information (storage capacity information) on the first storage device (such as the RAM 26B and the ROM 26C) and the second storage device (HDD 32), and notifies the effective measure examining unit 58 of the acquired information.

At this time, if allocations for individual devices including the image forming unit 20, the image reading unit 22, and the facsimile communication control unit 24 have been established for the first storage device, notification of such allocation information is also provided. As for the second storage device, it is desired that notification of information about its storage capacity be provided separately for used and free areas.

The effective measure examining unit 58 executes a capacity comparison operation. For example, this is executed as follows. For a received job, the effective measure examining unit 58 compares the data size (x-bytes) of one page of raster image with the storage capacity (y-bytes) of the RAM 26B that stores raster image data, and examines an effective measure for securing additional capacity equivalent to the difference in byte $\Delta(|x-y|)$. This effective measure represents selection of at least one of the following measures mentioned above: changing the storage area setting (Pattern 1), and adding more storage devices (Pattern 2).

In selecting one of Pattern 1 and Pattern 2, it is desired to consider Pattern 1, which represents a setting change, in preference to Pattern 2. This is because a setting change takes shorter time than arranging for more storage devices, and it is unnecessary to additionally purchase storage devices.

The effective measure examining unit 58 is connected to a message generator 62. Based on information (such as whether image quality has been reduced, and an effective measure) supplied from the effective measure examining unit 58, if a reduction in image quality is within an allowed range, the message generator 62 generates a message as illustrated in each of FIGS. 4C to 4E, and sends the message to the UI 30. Upon receiving the message, the UI 30 displays the message on the touch panel 30A (FIGS. 4C to 4E).

Operation according to the first exemplary embodiment will be described below with reference to the flowchart of FIGS. 6A and 6B.

FIG. 6A is a flowchart illustrating an image processing control routine performed upon job receipt according to the first exemplary embodiment.

At step 100, it is determined whether a job has been received. If the determination is negative, this routine ends. If the determination at step 100 is affirmative, the procedure transfers to step 102, and it is determined whether it is possible to perform processing at the image quality of the original data (at a required resolution). If the determination at step 102 is negative, it is not possible to perform processing at the image quality of the original data. Accordingly, the procedure transfers to step 104 where an instruction to examine an effective measure is provided (see FIG. 6B; details of this step will be described later). Then, the procedure transfers to step 106.

At step 106, an irreversible process, that is, an image quality reduction process that adjusts resolution (e.g., by thinning out pixels) is executed, and then the procedure transfers to step 108. In this regard, if the determination at step 102 is affirmative, it is possible to perform processing at the image quality required by the original data, and thus the procedure transfers to step 108.

At step 108, a RIP process is executed. That is, raster image data is generated on a unit-by-unit basis (on a page-by-page basis), and the procedure transfers to step 110. At step 110, the raster image data is sent to the image forming unit 20. Then, the procedure transfers to step 112 where an instruction to execute image formation is provided, and this routine ends.

FIG. 6B is a control flowchart for an effective measure examining process routine that activates when the corresponding instruction is provided at step 104 in FIG. 6A.

At step 114, original data is acquired, and then the procedure transfers to step 116 where information on storage devices (the RAM 26B, the ROM 26C, and the HDD 32) is acquired. The procedure then transfers to step 118.

At step 118, the difference between the storage capacity necessary to perform image processing using the original data, and the current storage device capacity is calculated, and then the procedure transfers to step 120 where an effective measure (Pattern 1 or Pattern 2 mentioned above) is set. The procedure then transfers to step 122. In some cases, there may be no effective measure.

At step 122, a message corresponding to the effective measure thus set is generated. The procedure then transfers to step 124 where the UI 30 is instructed to display the message, and this routine ends.

If Pattern 1 is set as the effective measure, the following message is displayed as illustrated in FIG. 4C: "The image has been printed at a reduced image quality. This situation can be improved by changing the setting of the first storage device".

If Pattern 2 is set as the effective measure, the following message is displayed as illustrated in FIG. 4D: "The image has been printed at a reduced image quality. This situation can be improved by adding more memory".

Further, if there is no effective measure, the following message is displayed as illustrated in FIG. 4E: "The image has been printed at a reduced image quality".

Second Exemplary Embodiment

A second exemplary embodiment will be described below. Components that are the same as those in the first exemplary embodiment will be denoted by the same reference signs to avoid repetitive descriptions of such components.

The first exemplary embodiment is based on the assumption that original data that has been processed is discarded in the course of the procedure from the receiving of original data to the RIP process. In this case, if, for example, an image is to be formed at a different image quality after more first storage devices (the RAM 26B and the ROM 26C) are added, it is required to request for a job again. Accordingly, in the second exemplary embodiment, a received job is temporarily stored into the second storage device (the HDD 32).

Operation according to the second exemplary embodiment will be described below with reference to the flowchart of FIGS. 7A to 7C. In the following description, for steps that are the same as those in the flowchart of FIGS. 6A and 6B described above with reference to the first exemplary embodiment, "A" will be attached to the end of the same reference signs to avoid repetitive descriptions of the corresponding steps.

FIG. 7A is a flowchart illustrating an image processing control routine performed upon job receipt according to the second exemplary embodiment.

At step 100A, it is determined whether a job has been received. If the determination is negative, this routine ends. If the determination at step 100A is affirmative, the procedure transfers to step 130 where an instruction to store original data into the HDD 32 is provided (see FIG. 7B; details of this step will be described later), and the procedure transfers to step 102A.

At step 102A, it is determined whether it is possible to perform processing at the image quality of the original data (at a required resolution). If the determination at step 102A is negative, it is not possible to perform processing at the image quality of the original data. Accordingly, the procedure transfers to step 104A where an instruction to examine an effective measure is provided (see FIG. 7C; details of this step will be described later). Then, the procedure transfers to step 106A.

At step 106A, an irreversible process, that is, an image quality reduction process that adjusts resolution resolution (e.g., by thinning out pixels) is executed, and then the procedure transfers to step 108A. If the determination at step 102A is affirmative, it is possible to perform processing at the image quality required by the original data, and thus the procedure transfers to step 108A.

At step 108A, a RIP process is executed. That is, raster image data is generated on a unit-by-unit basis (on a page-by-page basis), and the procedure transfers to step 110A. At step 110A, the raster image data is sent to the image forming unit 20. Then, the procedure transfers to step 112A where an instruction to execute image formation is provided, and this routine ends.

FIG. 7B is a control flowchart for an original-data storing process routine that activates when the corresponding instruction is provided at step 130 in FIG. 7A.

At step 132, it is determined whether the HDD 32 has enough storage capacity for storing original data. If the determination is negative, this routine ends. If the determination at step 132 is affirmative, the procedure transfers to step 134, where the original data is temporarily stored into the HDD 32, and this routine ends.

FIG. 7C is a control flowchart for an effective measure examining process routine that activates when the corresponding instruction is provided at step 104A in FIG. 7A.

At step 136, original data is acquired, and then the procedure transfers to step 138 where information about the first storage device (the RAM 26B and the ROM 26C) is acquired. The procedure then transfers to step 118A.

At step 118A, the difference between the storage capacity necessary to perform image processing using the original data, and the current storage device capacity is calculated, and then the procedure transfers to step 140 where an effective measure (Pattern 1 mentioned above) is set. The procedure then transfers to step 122A. In some cases, there may be no effective measure.

At step 122A, a message corresponding to the effective measure thus set is generated. The procedure then transfers to step 124A where the UI 30 is instructed to display the message, and this routine ends.

Third Exemplary Embodiment

A third exemplary embodiment will be described below. Components that are the same as those in the first and second exemplary embodiments will be denoted by the same reference signs to avoid repetitive descriptions of such components.

The third exemplary embodiment has the following characteristic feature. That is, for those image forming processes that involves reductions in image quantity, an allowable image quality range (resolution threshold) is set in advance, and if the necessity to reduce image quality beyond the allowable image quality range arises, the user is made to determine whether to continue processing and, at the same time, the user is made to determine whether to continue examination of an effective measure.

Figure 8:
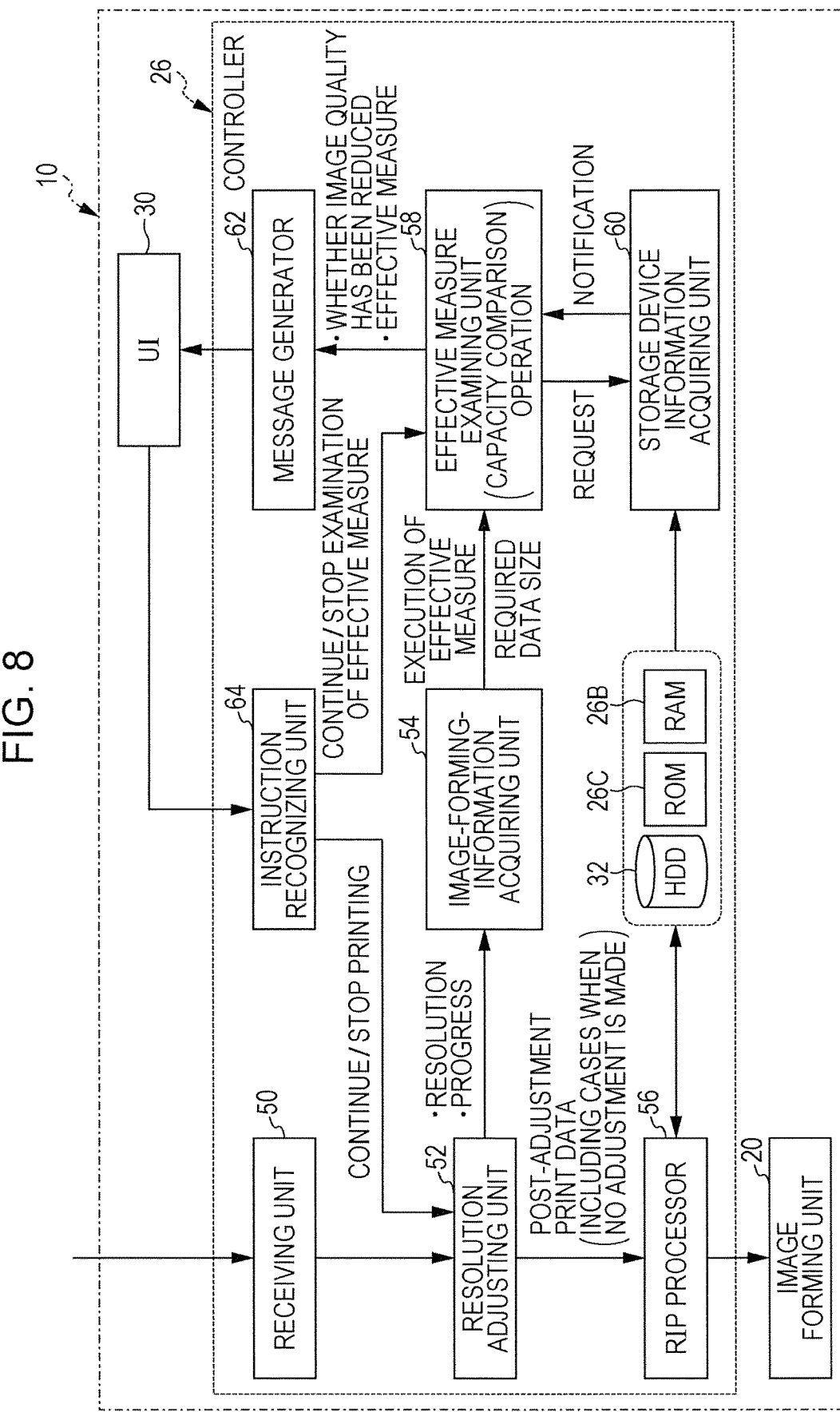
FIG. 8 illustrates functional blocks into which processes executed by a controller according to the third exemplary embodiment are divided by their function, the processes including a resolution control that reduces image quality to enable image formation and a process related to an effective measure to secure storage capacity.

As illustrated in FIG. 8, the effective measure examining unit 58 is connected to the message generator 62. Based on information (such as whether image quality has been reduced, and an effective measure) supplied from the effective measure examining unit 58, if a reduction in image quality is within an allowed range, the message generator 62 generates a message as illustrated in each of FIGS. 4C to 4E, and sends the message to the UI 30. Upon receiving the message, the UI 30 displays the message on the touch panel 30A (FIGS. 4C to 4E).

Figure 9A:
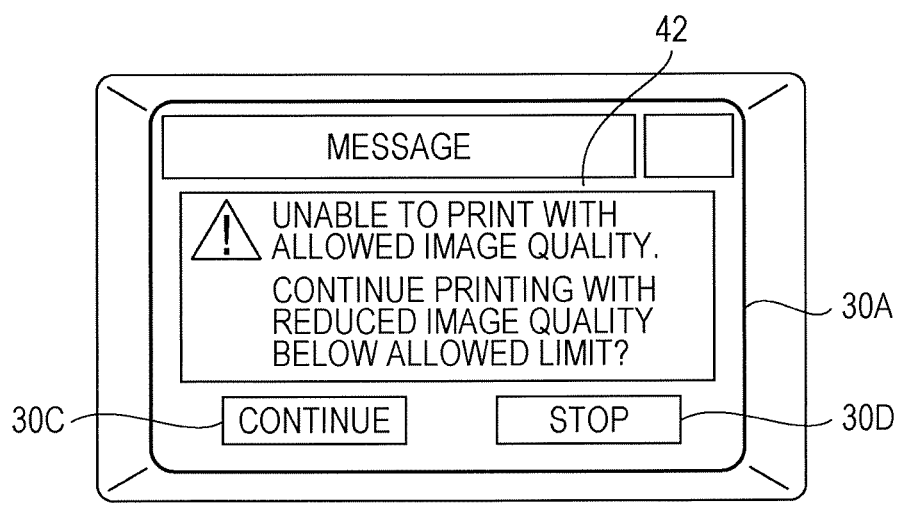
FIG. 9A is a front view of a touch panel according to the third exemplary embodiment with a message displayed on the touch panel.
Figure 9B:
FIGS. 9B and 9C each illustrate exemplary transition of a message displayed on the touch panel.
Figure 9C:
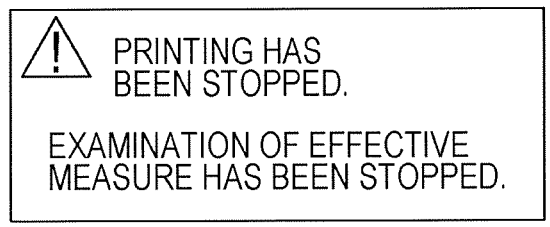

According to the third exemplary embodiment, if a reduction in image quality exceeds an allowed range, messages illustrated in FIGS. 9A to 9C are displayed, and also buttons 30C and 30D each representing an example of a first selecting unit are displayed to prompt the user to continue or stop image formation and examination of an effective measure.

An instruction recognizing unit 64 is notified of an operational instruction given from the UI 30. The instruction recognizing unit 64 is connected to the resolution adjusting unit 52 and the effective measure examining unit 58 to instruct each of these units to continue or stop processing.

As illustrated in FIG. 9A, the following message is displayed: "Unable to print with allowed image quality. Continue printing with reduced image quality below the allowed limit?".

The user selects the button 30C or 30D to provide an instruction to continue or stop processing. When an instruction to continue is provided, printing with reduced image quality below the allowed limit, and examination of an effective measure are continued. When an instruction to stop is provided, printing with reduced image quality below the allowed limit, and examination of an effective measure are stopped.

Two cases are conceivable at this time. In one case, examination of an effective measure is already finished at the time when an instruction to stop is provided. In the other case, examination of an effective measure is not yet finished at the time when an instruction to stop is provided.

Accordingly, after an instruction to stop is provided, for example, the following message is displayed as illustrated in FIG. 9B if examination of an effective measure is already finished at that time: "Printing has been stopped. This situation can be improved by changing the setting of the first storage device".

Further, after an instruction to stop is provided, for example, the following message is displayed as illustrated in FIG. 9C if examination of an effective measure is not yet finished at that time: "Printing has been stopped. Examination of an effective measure has been stopped".

As illustrated in FIGS. 10A to 10D, whether to continue or stop image formation, and whether to continue or stop examination of an effective measure may be selected separately.

That is, as illustrated in FIG. 10A, the following message is displayed as a first message: "Unable to print with allowed resolution. Continue printing with reduced image quality below the allowed limit?". At the same time, buttons 30E and 30F each representing an example of a second selecting unit are displayed to prompt the user to continue or stop printing. When an instruction to continue is provided, printing is continued. When an instruction to stop is provided, printing is stopped.

At this time, when an instruction to stop printing is provided, as illustrated in FIG. 10B, the following message is displayed as a second message: "Printing has been stopped. Continue examination of an effective measure?". At the same time, buttons 30G and 30H each representing an example of a third selecting unit are displayed to prompt the user to continue or stop examination of an effective measure. When an instruction to continue is provided, examination of an effective measure is continued. When an instruction to stop is provided, examination of an effective measure is stopped.

As illustrated in FIG. 10C, when an instruction to continue examination of an effective measure is provided, the following message is displayed: "This situation can be improved by changing the setting of the first storage device".

As illustrated in FIG. 10D, when an instruction to stop examination of an effective measure is provided, the following message is displayed: "Examination of an effective measure has been stopped".

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image forming apparatus comprising:
a processor, configured to:
if there is a shortage of storage capacity for image information necessary to perform image formation, execute the image formation at a reduced image quality below a required image quality; and inform that image formation has been executed at a reduced image quality, and inform an effective measure in response to the image formation being executed at the reduced image quality to enable image formation that does not involve a reduction in image quality, wherein the effective measure is based on current storage capacity and storage capacity for image information to enable the image formation that does not involve the reduction in image quality, and wherein the effective measure includes at least one of making a setting change to storage capacity allocation and increasing storage capacity.

2. The image forming apparatus according to claim 1, wherein if making the setting change as the effective measure secures a storage capacity for image information necessary to perform image formation, the processor informs the setting change as the effective measure in preference to the increasing of storage capacity.

3. The image forming apparatus according to claim 1, wherein the processor informs that image formation has been executed at the reduced image quality if the effective measure does not exist.

4. The image forming apparatus according to claim 1, wherein if the setting change fails to secure a storage capacity for image information necessary to perform image formation but the increasing of storage capacity secures the storage capacity for image information necessary to perform image formation, the processor informs the increasing of storage capacity as the effective measure.

5. The image forming apparatus according to claim 1, wherein if performing image formation within a predetermined allowed range of image quality reduction leads to a shortage of storage capacity, the processor informs that it is not possible to perform the image formation, and if the effective measure exists, the processor informs the effective measure.

6. The image forming apparatus according to claim 5, wherein the processor is further configured to:

if it is found after start of image formation that performing the image formation within a predetermined allowed range of image quality reduction leads to a shortage of storage capacity, enable selection of whether to stop the image formation and examination of the effective measure, wherein if the examination of the effective measure is already finished at a time when a selection to stop the image formation is made, the effective measure is informed.

7. The image forming apparatus according to claim 5, wherein the processor is further configured to:

if it is found after start of image formation that performing the image formation within a predetermined allowed range of image quality reduction leads to a shortage of storage capacity, enable selection of whether to stop the image formation; and if examination of presence of the effective measure is being continued at a time when a selection to stop the image formation is made, enable selection of whether to stop the examination of the effective measure, wherein if a selection to stop the examination of the effective measure is not made, or if the examination of the effective measure is already finished at a time when a selection to stop the examination of the effective measure is made, the effective measure is informed.

8. The image forming apparatus according to claim 1, wherein the processor is further configured to:

store the image information into a second storage device, and load the image information from the second storage device into a first storage device on a per-unit of image information basis in a manner that allows image formation, wherein if the second storage device has a storage capacity for storing the image information, the image information is stored into the second storage device in advance, and in response to a request for examining the effective measure to address a shortage of storage capacity of the first storage device, the image information stored in the second storage device is read and examination of the effective measure is executed, and the effective measure is informed.

* * * * *